(12) United States Patent
Toublanc

(10) Patent No.: US 7,037,049 B2
(45) Date of Patent: May 2, 2006

(54) ROTARY CUTTING TOOL AND HIGH SPEED MACHINING METHOD WITH NANO-LUBRICATION USING SUCH A TOOL

(75) Inventor: Yves Toublanc, La Chapelle sur Erdre (FR)

(73) Assignee: Airbus France, Toulouse Cedex (FR)

( * ) Notice: Subject to any disclaimer, the term of this patent is extended or adjusted under 35 U.S.C. 154(b) by 77 days.

(21) Appl. No.: 10/193,784

(22) Filed: Jul. 11, 2002

(65) Prior Publication Data

US 2003/0026666 A1 Feb. 6, 2003

(30) Foreign Application Priority Data

Jul. 13, 2001 (FR) .................................. 01 09372

(51) Int. Cl.
*B23C 5/21* (2006.01)
(52) U.S. Cl. ..................... 407/11; 407/65; 407/113; 407/120
(58) Field of Classification Search ................ 407/11, 407/65, 113, 120; 408/59
See application file for complete search history.

(56) References Cited

U.S. PATENT DOCUMENTS

| 3,037,264 | A | | 6/1962 | Mossberg | |
|---|---|---|---|---|---|
| 3,591,302 | A | * | 7/1971 | Andreasson | 408/59 |
| 5,049,009 | A | | 9/1991 | Beck et al. | 407/54 |
| 5,333,938 | A | * | 8/1994 | Gale | 299/106 |
| 5,429,459 | A | | 7/1995 | Palm | 409/66 |
| 5,701,578 | A | | 12/1997 | Liu | 428/565 |
| 5,980,166 | A | * | 11/1999 | Ogura | 408/57 |
| 6,000,887 | A | * | 12/1999 | Hoefler et al. | 408/230 |
| 6,045,301 | A | * | 4/2000 | Kammermeier et al. | 408/59 |
| 6,116,825 | A | * | 9/2000 | Kammermeier et al. | 279/20 |

FOREIGN PATENT DOCUMENTS

| DK | DE 878 456 | 4/1953 |
|---|---|---|
| DK | DE 36 20 115 | 12/1987 |
| EP | 0 155 216 | 3/1985 |
| GB | 1 008 701 | 11/1965 |
| WO | WO 94 21412 | 9/1994 |

* cited by examiner

*Primary Examiner*—Willmon Fridie, Jr.
(74) *Attorney, Agent, or Firm*—Thelen Reid & Priest LLP

(57) ABSTRACT

Rotary cutting tool, in particular for high speed machining with nano-lubrication.

The lubricant is fed to the end surface of the cutting part (12) of the tool through a central lubrication channel (22) drilled along the axis of rotation (10) of the tool, with one non-through end, located just near the end surface, which is connected to the latter by secondary channels (24) opening near each end cutting edge (20). Cutting parameters relating, in particular, to the end dedendum angle, the width of end clearance and the width of the circular land of each cutting edge further improve the quality of the work carried out.

45 Claims, 3 Drawing Sheets

ROTARY CUTTING TOOL AND HIGH SPEED MACHINING METHOD WITH NANO-LUBRICATION USING SUCH A TOOL

TECHNICAL FIELD

The invention relates to a rotary cutting tool, designed in particular for carrying out direct drilling of a bore, in solid material, finishing or rectifying an existing bore, or for planetary machining.

The invention also relates to a high speed machining method, with nano-lubrication, using a cutting tool according to the invention.

Nonetheless, these operating conditions are non-limiting. Thus, the cutting tool according to the invention can also be used for machining with lubrication by cutting oil in emulsion or by micro-pulverisation, or furthermore with compressed air circulation in order to cool the cutting surface.

STATE OF THE ART

In a known fashion, a rotary cutting tool comprises, successively, according to its length, a cutting section of diameter d and of length $L_u$ (useful cutting length), a clearance section of diameter $d_1 < d$ and a tail of diameter $d_q$, allowing fixation of the tool on the machine.

The cutting part of the machine comprises at least one side cutting edge, bevelled helically according to a helix angle He. Each side cutting edge is constituted of a circular land, of small width, followed by a first side clearance and at least a second side clearance, sometimes called a side counter-clearance. The last side clearance is followed by a gouge enabling evacuation of the chips.

The cutting portion of the tool also comprises as many end cutting edges as side cutting edges. Each end cutting edge is constituted of a first end clearance followed by at least a second end clearance, sometimes called an end counter-clearance.

In a known fashion and as illustrated diagrammatically in FIGS. 1a and 1b in the attached drawings, the cutting edges of a rotary cutting tool are characterised by a certain number of parameters. Among these parameters, FIG. 1a shows the end cutting angle A, the end clearance angle B, the end clearance width C and the end counter-clearance angle D. FIG. 1b shows the side cutting angle E, the side clearance angle F, the width of the side clearance G and the side counter-clearance angle H.

Another parameter, not shown in FIGS. 1a and 1b, is the dedendum angle. This angle is defined as being the angle between the end cutting edge and a plane orthogonal to the axis of rotation of the tool.

As an example, in the case of a classic cutting tool used for high speed machining with micro-pulverisation, the helix angle can be 17°, the end cutting angle 10°, the end clearance angle 9° and the useful cutting length equal to 0.5 d, d being the cutting diameter.

Among rotary cutting tools, some are designed to be used for high speed machining. Among these tools, as example, one can mention those manufactured by the Société DIAGER referenced 41.001 and 46.201. Such tools have one or several cutting edges and have as many helicoidal lubrication channels, rolled around their rotation axis, as they have cutting edges. They are intended to be used with lubrication by cutting oil emulsion or by micro-pulverisation of oil droplets of the order of several microns.

Such a lubrication poses problems, linked in particular to the high quantity of lubricant thus required.

A first problem concerns the need to subsequently degrease the machined parts. This operation is costly. Furthermore, its impact on the environment has to be taken into account. Indeed, the degreasing of parts is frequently carried out using solvents, whose use is controlled more and more severely.

A second problem linked to the use of high quantities of lubricant relates to the resulting cost, because of the price of said lubricant.

Another problem concerns the pollution of the atmosphere in the workshop. Indeed, this pollution can provoke risks of allergies for the staff working in the workshop.

A further problem concerns the necessity of destroying a significant quantity of used lubricant, which is penalizing, on the one hand, because of the cost of destruction and, on the other hand, because of the release into the environment.

It is possible to reduce the quantity of lubricant used significantly by replacing micro-pulverisation by nano-pulverisation. This technique consists of pulverising oil droplets of dimensions of the order of several nanometers. It is sometimes implemented by means of a nozzle which pulverises the lubricant on the machined surface or closely next to it.

Nonetheless, this technique is difficult to implement in the case of deep holes such as those which can be machined by means of cutting tools equipped with helicoidal lubrication channels, for example the DIAGER tools mentioned above.

Thus, trials carried out by replacing micro-pulverisation by nano-pulverisation, in helicoidal lubrication channels for tools mentioned above, produced poor quality holes and/or breaking of the tools.

The origin of these problems lies in quasi-nil lubrication of the cutting surface, due to the fact that the oil droplets cannot exit from the lubrication channels correctly. Indeed, since the latter are helicoidal and thus staggered relative to the rotation axis of the tool, when the latter turns at high speed, the oil nano-droplets are submitted to high centrifugal forces (radial relative to the axis of rotation). These centrifugal forces stick the nano-droplets against the walls of the lubrication channels, where they condense. As a result, the advance of the nano-droplets towards the cutting surface, in the direction of the axis of rotation of the tool, becomes negligible. The cutting surface is thus not lubricated correctly. Furthermore, after using the tool for a certain time, the condensed droplets may block the lubrication channels.

Finally, document U.S. Pat. No. 5,429,459 describes a rotary cutting tool making it possible to drill a hole in a part, and then to bore this hole using an orbital movement. At its end, the tool comprises two end cutting edges forming a V-shaped point between them. A fluid under pressure, intended to evacuate the chips from the hole, is injected into the tool through a central channel prolonged by two inclined channels which open out at the end of the tool, behind the two end cutting edges.

DESCRIPTION OF THE INVENTION

The aim of the invention is a rotary cutting tool whose original design allows it in particular to carry out high-speed machining with nano-lubrication, while ensuring the correct finished specifications and a reduced risk of breaking the tool.

According to the invention, this result is obtained by means of a rotary cutting tool comprising a cutting part centred on an axis of rotation of the tool and comprising a side surface with at least one side cutting edge and an end surface with at least one end cutting edge, means for feeding fluid being provided for supplying fluid to the end surface, close to each end cutting edge, the means for feeding in the lubricant comprising a central lubrication channel drilled along the axis of rotation of the tool and at least one secondary channel linking one non-through end of the central channel to the end surface, close to each end cutting edge, characterised in that the end cutting edge, relative to a plane perpendicular to the axis of rotation of the tool, forms an end dedendum angle of between about 3° and about 20°.

The input of nano-droplets of lubricant through a central lubrication channel drilled along the axis of rotation of the tool makes it possible to produce a channel of adequate diameter, without significantly embrittling the solidity of the tool and limits the centrifugal forces applied on the nano-droplets of lubricant. Furthermore, since the central lubrication channel is centred on the axis of rotation of the tool, it does not introduce any unbalancing.

In order to obtain maximum limitation of the phenomenon of oil droplet centrifuging, the non-through end of the central channel is advantageously located closely next to the end surface of the cutting part. In other terms, the length of the secondary channels is as short as possible.

Preferably, in order to limit load losses, the secondary channels have cross-sections whose sum is at least equal to the cross-section of the central channel.

Since each end cutting edge comprises, in the usual way known, a first end clearance and at least one secondary end clearance, each of the secondary channels advantageously opens into said secondary clearance, at a distance of at least 0.5 mm from the first end clearance.

Preferably, a tool is used in which the end dedendum angle is substantially equal to 6°.

For similar reasons, each side cutting edge advantageously comprises a circular land of non-nil width, less than 0.1 mm.

Preferably, so as to further improve the machining quality, each end cutting edge comprises a first end clearance of width between 0.3 mm and 0.4 mm. Advantageously, this width is substantially equal to 0.3 mm.

Usually, tool comprises, successively, beyond the cutting part and according to the axis of rotation of the tool, a clearance section of diameter $d_1$ and a tail section of diameter $d_Q$. Advantageously, so as not to embrittle the tool, these two sections are connected to each other along a connection radius $R_R$ at least equal to $(d_Q-d_1)/2$, with a minimum of 0.1 $d_Q$.

For similar reasons, the side and end cutting edges are advantageously connected to each other by a rounding or a chamfer of 0.1 mm oriented at 45° relative to the axis of rotation of the tool.

The invention also relates to a cutting method using a rotary cutting tool such as that described above. This method consists of machining a bore in a part by a rotational movement of the tool around its axis and a forward movement of the tool along said axis, while injecting a fluid constituted of nano-droplets of lubricant through the central channel and through the secondary channel.

BRIEF DESCRIPTION OF THE DRAWINGS

As an illustrative and non-limiting example, a preferred embodiment of the invention will now be described, with reference to the attached drawings, in which.

DETAILED DESCRIPTION OF A PREFERRED EMBODIMENT OF THE INVENTION

Figure 2:
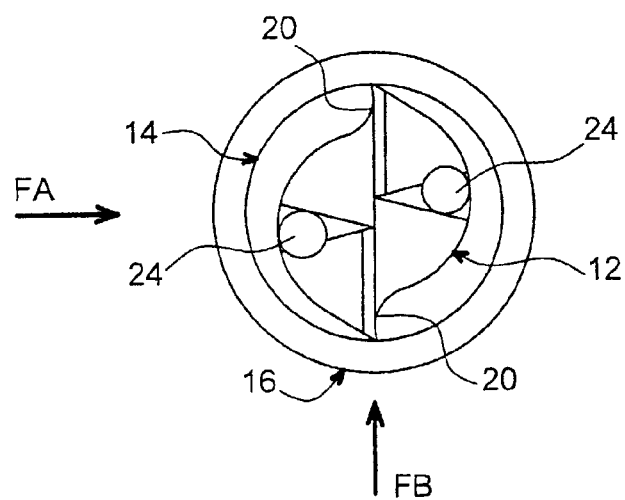
FIG. 2 is an end view of a cutting tool according to the invention.
Figure 3B:
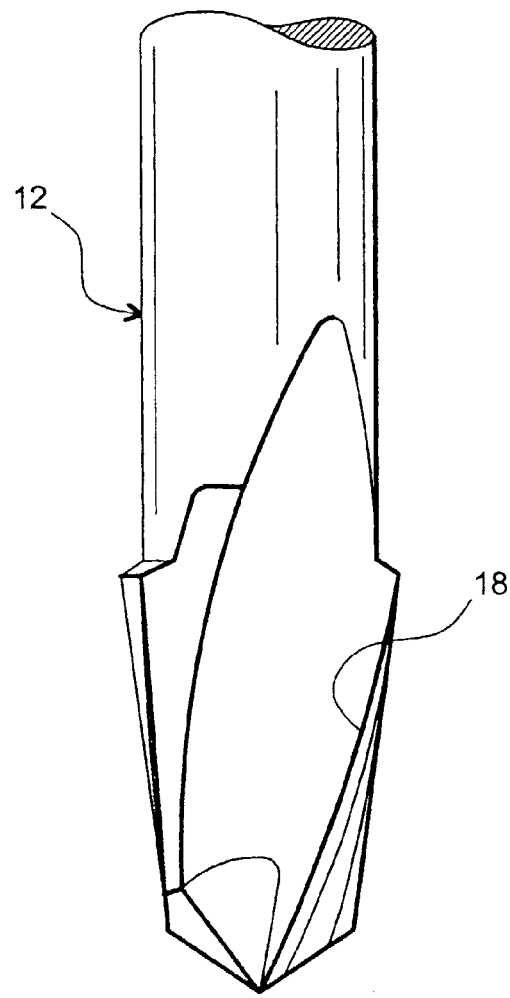
FIGS. 3a and 3b are side views of the cutting tool according to the invention, shown respectively in the direction of the arrows FA and FB of FIG. 2, staggered between them by 90° around the axis of rotation of the tool.
Figure 3A:
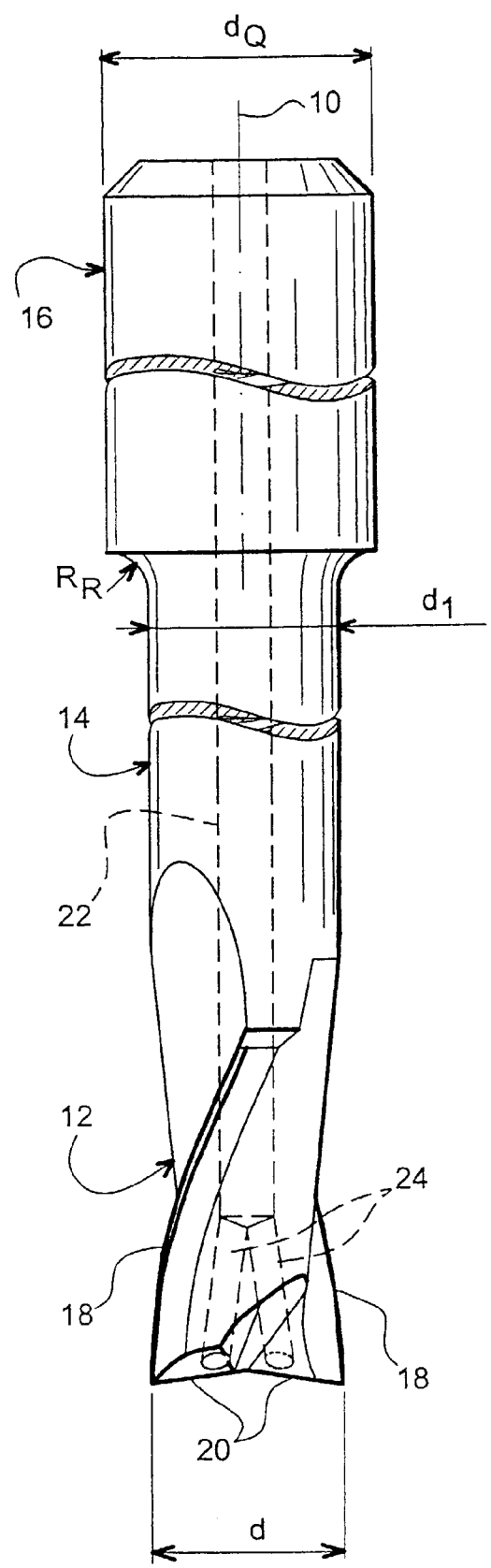

As shown in FIGS. 2, 3a and 3b, a rotary cutting tool according to the invention comprises, in a known fashion, three distinct parts set along its length, i.e. along an axis of rotation 10 of the tool.

Starting from the cutting end of the tool, these three parts comprise a cutting part 12, a clearance part 14 and a tail part 16.

The cutting part 12 has a diameter d, called "cutting diameter" and a length $L_u$, called "useful cutting length".

The clearance part 14 has a diameter $d_1$ such that $d_1<d$, so that the surface of this clearance part does not rub on the surface already machined. Nonetheless, the diameter $d_1$ must not be too small, so that the tool preserves adequate rigidity.

Finally, the tail part 16 of the tool has a diameter $d_Q$. This diameter enables attachment of the tool on the machine. It is a function of the accepted diameters for the machine.

In the preferred embodiment of the invention shown in FIG. 3a, the clearance part 14 and the tail part 16 are connected to each other along a connection radius $R_R$ equal at least to $(d_Q-d_1)/2$. Furthermore, the minimum value of this connecting radius $R_R$ is 0.1 $d_Q$. These characteristics make it possible not to embrittle the tool at the limit between the tail part 16 and the clearance part 14.

For similar reasons, in the preferred embodiment according to the invention shown in FIGS. 3a and 3b, the clearance part 14 and the cutting part 12 of the tool are connected to each other through a chamfer (not shown) forming an angle of about 30° relative to the axis of rotation 10 of the tool. The use of a connection radius is excluded, since it involves a part of the tool already cut.

In a known fashion, the cutting part 12 of the tool comprises a side or peripheral surface with at least one side cutting edge 18 (two in FIGS. 2, 3a and 3b) and an end surface provided with the same number of end cutting edges 20 as said cutting part 12 comprises side cutting edges. More precisely, each end cutting edge 20 is connected to a side cutting edge 18.

In the preferred embodiment of the invention, this connection is ensured by a rounding or a chamfer (not shown) of 0.1 mm, oriented at about 45° relative to the axis of rotation 10 of the tool. This characteristic makes it possible to avoid embrittling the tool too much.

According to an essential characteristic of the invention, the rotary cutting tool shown in FIGS. 2, 3a and 3b comprises means for feeding a lubricant, of an original design, conceived for enabling the use of nano-lubrication for high speed machining.

More precisely, these means for feeding the lubricant comprise a central lubrication channel 22, drilled along the axis of rotation 10 of the tool, so as not to open onto the end surface of the cutting part 12.

The means for feeding the lubricant also comprise as many secondary channels 24 as end cutting edges 20. More precisely, each secondary channel 24 links the non-through end of the central lubrication channel 22 to the end surface of the cutting part 12, so as to open out closely to each of the end cutting edges 20.

The non-through end of the central lubrication channel 22 is located very closely to the end surface of the cutting part 12 of the tool. This characteristic makes it possible to give the secondary channels 24 the shortest length possible, in order to limit as far as possible the centrifuging phenomenon for the lubricant droplets.

In the arrangement described above, the central lubrication channel 22 has the advantage of not introducing any unbalance since it is centred on the axis of rotation 10 of the tool. Furthermore, this central position makes it possible to produce a channel of sufficient diameter without any significant embrittling of the solidity of the tool, and limits the centrifugal forces applied on the nano-droplets.

The cross-section of the central lubrication channel 22 is advantageously fixed at a sufficiently high level so as to limit load losses when the lubricant circulates in the central channel 22 to reach the secondary channels 24. Preferably, the sum of the cross-sections of the secondary channels 24 is at least equal to and, preferably, greater than the cross-section of the central channel 22. In the contrary case, the sum of the cross-sections of the secondary channels 24 is given as high a value as possible.

Preferably, in order to further improve the quality of high speed machining in the presence of nano-lubrication, these characteristics concerning the feed means of the lubricant are associated with characteristics concerning the tool size parameters. Indeed, the presence of a central channel prolonged by secondary channels according to the invention can prove to be insufficient, in some cases, for producing a machining of the desired quality. This can be explained by the fact that, following the geometric shape of the tools, vibrations, rubbing, etc. can occur, which can have the consequence of a lower quality of the machined hole (diameter tolerances, surface state, etc.), rupture of the tool or premature wear of the latter, excessive forces on the spindle head supporting the tool, etc.

Advantageously, in order to overcome these problems, the tool according to the invention is trimmed following preferred parameters which will now be described.

The first of these parameters concerns the end dedendum angle, formed between the end cutting edge 20 and a plane perpendicular to the axis of rotation 10 of the tool. The minimum and maximum values of this angle are 3° and 20° respectively. The optimum value for the end dedendum angle is 6°.

Figure 1A:
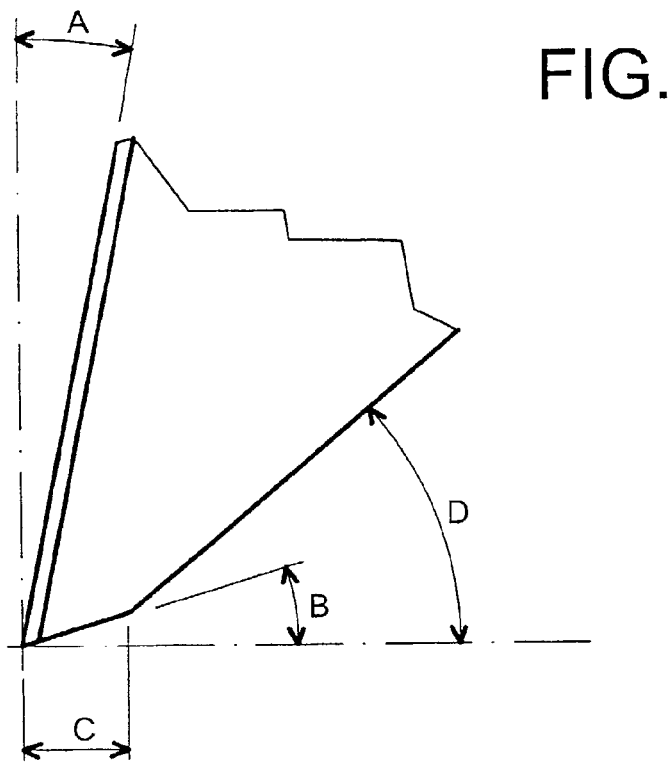
FIGS. 1a and 1b, already described above, show the principal cutting parameters, end and side respectively, characterising the cutting edges of a cutting tool.
Figure 1B:
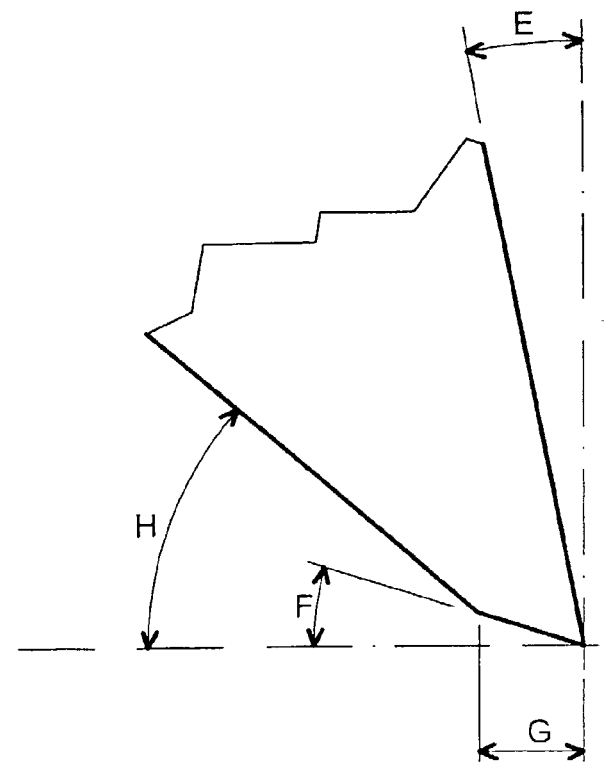

Another important parameter is the end clearance width C (FIG. 1a), i.e. the width of the first end clearance, seen in a plane perpendicular to the axis of rotation 10 of the tool, i.e. to say in the plane of FIG. 2. Preferably, this width is comprised between a minimum value of 0.3 mm and a maximum value of 0.4 mm. The optimum value for the width of the end clearance is 0.3 mm.

A third preferred parameter concerns the width of the circular land for each side cutting edge 18. This value is comprised between any non-nil minimum value and a maximum value equal to 0.1 mm. Indeed, in the absence of a circular land, the cutting edge is embrittled and, for values greater than 0.1 mm, there is too much rubbing against the machined surface, which can produce vibrations.

The other size parameters of the tool have fewer consequences on the quality of work carried out by the tool. Thus, the parameters concerning the counter-clearances can vary within the general accepted and practised ranges.

The minimum and maximum values of the cutting parameters as a whole, together with their optimum values, are given in the following table:

| Parameter | Minimum value | Optimum value | Maximum value |
| --- | --- | --- | --- |
| Width of circular land | >0 | Non-specified | 0.1 mm |
| Width of end clearance | 0.3 mm | 0.3 mm | 0.4 mm |
| End dedendum angle | 3° | 6° | 20° |
| End cutting angle | 3° | 10° | 30° |
| Angle of 1st end clearance | 4° | 15° | 30° |
| Angle of 2nd end clearance | Non-specified | 30° | Non-specified |
| Side cutting angle | 3° | 10° | 20° |
| Angle of 1st side clearance | 5° | 12° (+0°; −2°) | 20° |
| Helix angle | 12° | 25° | 40° |
| Cutting length | 0.25 d | | 2 d |

In this table, the minimum and maximum values are given for a variation of the single parameter considered relative to its optimum or nominal value and not for simultaneous variations of the ensemble of parameters. Furthermore, apart from specifications to the contrary, tolerances of +/−1° are to be envisaged for the values of the angles.

As mentioned above, each secondary channel 24 opens onto the end surface of the cutting part 12 of the tool, close to the end cutting edge 20, preferably in one of the secondary end clearances, at a distance of at least 0.5 mm from the first end clearance.

In the preferred embodiment according to the invention, which has just been described above, with reference to FIGS. 2, 3a and 3b, the tool is optimised so as to be able to work in high speed planetary machining, with nano-lubrication. More precisely, the digital values are especially adapted to the case of a tool in tungsten carbide intended for machining aluminium parts.

More generally, the invention applies to varied working conditions. Thus, the means for feeding the lubricant can also be used to carry out lubrication with cutting oil in emulsion or by micro-pulverisation. They can also serve to circulate compressed air in order to cool the cutting surface.

When used for high speed machining with nano-lubrication, the cutting tool according to the invention is mounted on an orbital machining machine commercially available. As a non-limiting example, this machine can turn the rotary cutting tool at a high speed of about 18,000 revs per minute.

A lubrication unit is then also mounted on the machining machine. The exit from the lubrication unit is connected to the central lubrication channel of the tool, via the machine tool-holder. The lubrication unit is supplied with compressed air according to an adjustable pressure. Thus, in the central channel of the tool, droplets are injected with a size of the order of several nanometers.

The lubrication unit can in particular be a unit manufactured by the German firm of T.K.M., Sprüh-und-Dosiergeräte gMbH, Koellestr 29a, 76189 Karlsruhe.

The invention claimed is:

1. Rotary cutting tool adapted for rotation about an axis of rotation, said rotary cutting tool comprising a cutting part centered on the axis of rotation of the tool and comprising a side surface with at least one side cutting edge and an end surface with at least one end cutting edge, means for feeding fluid being provided for feeding a fluid onto the end surface, close to each end cutting edge, the means for fluid feed comprising a central lubrication channel drilled along the axis of rotation of the tool and having a closed end, and at least one secondary channel having a smaller cross section than said central lubrication channel and linking the closed end of the central channel to the end surface, close to each end cutting edge, wherein the end surface of the tool has a concave shape and the end cutting edge, relative to a plane perpendicular to the axis of rotation of the tool, forms an end dedendum angle between about 3° and about 20°, wherein each side cutting edge comprises a non-nil circular land, less than 0.1 mm.

2. Rotary cutting tool adapted for rotation about an axis of rotation, said rotary cutting tool comprising a cutting part centered on the axis of rotation of the tool and comprising a side surface with at least one side cutting edge and an end surface with at least one end cutting edge, means for feeding fluid being provided for feeding a fluid onto the end surface, close to each end cutting edge, the means for fluid feed comprising a central lubrication channel drilled along the axis of rotation of the tool and having a closed end, and at least one secondary channel having a smaller cross section than said central lubrication channel and linking the closed end of the central channel to the end surface, close to each end cutting edge, wherein the end surface of the tool has a concave shape and the end cutting edge, relative to a plane perpendicular to the axis of rotation of the tool, forms an end dedendum angle between about 3° and about 20°, wherein each end cutting edge comprises a first end clearance of width comprised between 0.3 mm and 0.4 mm.

3. Rotary cutting tool adapted for rotation about an axis of rotation, said rotary cutting tool comprising a cutting part centered on the axis of rotation of the tool and comprising a side surface with at least one side cutting edge and an end surface with at least one end cutting edge, means for feeding fluid being provided for feeding a fluid onto the end surface, close to each end cutting edge, the means for fluid feed comprising a central lubrication channel drilled along the axis of rotation of the tool and having a closed end, and at least one secondary channel having a smaller cross section than said central lubrication channel and linking the closed end of the central channel to the end surface, close to each end cutting edge, wherein the end surface of the tool has a concave shape and the end cutting edge, relative to a plane perpendicular to the axis of rotation of the tool, forms an end dedendum angle between about 3° and about 20°, wherein the side and end cutting edges and are connected together by a rounding or a chamfer of 0.1 mm oriented at 45° relative to the axis of rotation of the tool.

4. Rotary cutting tool adapted for rotation about an axis of rotation, said rotary cutting tool comprising a cutting part centered on the axis of rotation of the tool and comprising a side surface with at least one side cutting edge and an end surface with at least one end cutting edge, means for feeding fluid being provided for feeding a fluid onto the end surface, close to each end cutting edge, the means for fluid feed comprising a central lubrication channel drilled along the axis of rotation of the tool and having a closed end, and at least one secondary channel having a smaller cross section than said central lubrication channel and linking the closed end of the central channel to the end surface, close to each end cutting edge, wherein the end surface of the tool has a concave shape and the end cutting edge, relative to a plane perpendicular to the axis of rotation of the tool, forms an end dedendum angle between about 3° and about 20°, wherein each secondary channel opens onto the end surface of the cutting part, in a secondary clearance of an end cutting edge, at a distance of at least 0.5 mm from a first end clearance of said end cutting edge.

5. Rotary cutting system comprising:

a lubrication unit for creating droplets of fluid;

a rotary cutting tool comprising a cutting part centered on an axis of rotation and comprising a side surface with at least one side cutting edge and an end surface with at least one end cutting edge;

means for feeding fluid being provided for feeding a fluid onto the end surface, close to each end cutting edge, the means for fluid feed comprising a central lubrication channel drilled along the axis of rotation of the tool and having a closed end, and at least one secondary channel linking the closed end of the central channel to the end surface, close to each end cutting edge, wherein the end surface of the tool has a concave shape and the end cutting edge, relative to a plane perpendicular to the axis of rotation of the tool, forms an end dedendum angle between about 3° and about 20°; and, means for conveying droplets of fluid from said lubrication unit to said central lubrication channel.

6. Rotary cutting tool according to claim 1, in which the closed end of the central channel is located very closely to the end surface of the cutting part.

7. Rotary cutting tool according to claim 1, in which the secondary channels have cross-sections whose sum is at least equal to the cross-section of the central channel.

8. Rotary cutting tool according to claim 1, in which the end dedendum angle is closely equal to 6°.

9. Rotary cutting tool according to claim 2, in which the width of the first clearance is closely equal to 0.3 mm.

10. Rotary cutting tool according to claim 1, in which said tool comprises, successively, beyond the cutting part and along the axis of rotation of the tool, a clearance section of diameter d, and a tail section of diameter $d_Q$, connected to each other along a connection radius RR at least equal to $d_Q$–$d_1$/2, with a minimum of 0.1 $d_Q$.

11. Rotary cutting tool according to claim 10, in which the clearance part and the cutting part are connected to each other according to an angle of about 30°.

12. Rotary cutting tool according to claim 6, in which the secondary channels have cross-sections whose sum is at least equal to the cross-section of the central channel.

13. Rotary cutting tool according to claim 6, in which the end dedendum angle is closely equal to 6°.

14. Rotary cutting tool adapted for rotation about an axis of rotation, said rotary cutting tool comprising a cutting part centered on the axis of rotation of the tool and comprising a side surface with at least one side cutting edge and an end surface with at least one end cutting edge, means for feeding fluid being provided for feeding a fluid onto the end surface, close to each end cutting edge, the means for fluid feed comprising a central lubrication channel drilled along the axis of rotation of the tool and having a closed end, and at least one secondary channel having a smaller cross section than said central lubrication channel and linking the closed end of the central channel to the end surface, close to each end cutting edge, wherein the end surface of the tool has a concave shape and the end cutting edge, relative to a plane perpendicular to the axis of rotation of the tool, forms an end dedendum angle between about 3° and about 20°, wherein the closed end of the central channel is located very closely to the end surface of the cutting part, and each side cutting edge comprises a non-nil circular land, less than 0.1 mm.

15. Rotary cutting tool adapted for rotation about an axis of rotation, said rotary cutting tool comprising a cutting part centered on the axis of rotation of the tool and comprising a side surface with at least one side cutting edge and an end surface with at least one end cutting edge, means for feeding fluid being provided for feeding a fluid onto the end surface, close to each end cutting edge, the means for fluid feed comprising a central lubrication channel drilled along the axis of rotation of the tool and having a closed end, and at least one secondary channel having a smaller cross section than said central lubrication channel and linking the closed end of the central channel to the end surface, close to each end cutting edge, wherein the end surface of the tool has a concave shape and the end cutting edge, relative to a plane perpendicular to the axis of rotation of the tool, forms an end dedendum angle between about 3° and about 20°, wherein the closed end of the central channel is located very closely to the end surface of the cutting part, and each end cutting edge comprises a first end clearance of width comprised between 0.3 mm and 0.4 mm.

16. A system according to claim 5 wherein said lubrication unit creates droplets of fluid with a size on the order of several nanometers.

17. A system according to claim 5, in which the closed end of the central channel is located very closely to the end surface of the cutting part.

18. A system according to claim 5, in which the secondary channels have cross-sections whose sum is at least equal to the cross-section of the central channel.

19. A system according to claim 5, in which the end dedendum angle is closely equal to 6°.

20. A system according to claim 5, in which each side cutting edge comprises a non-nil circular land, less than 0.1 mm.

21. A system according to claim 5, in which each end cutting edge comprises a first end clearance of width comprised between 0.3 mm and 0.4 mm.

22. A system according to claim 21, in which the width of the first clearance is closely equal to 0.3 mm.

23. A system according to claim 5, in which said tool comprises, successively, beyond the cutting part and along the axis of rotation of the tool, a clearance section of diameter d, and a tail section of diameter $d_Q$, connected to each other along a connection radius RR at least equal to $d_Q-d_1/2$, with a minimum of 0.1 $d_Q$.

24. A system according to claim 23, in which the clearance part and the cutting part are connected to each other according to an angle of about 30°.

25. A system according to claim 5, in which the side and end cutting edges and are connected together by a rounding or a chamfer of 0.1 mm oriented at 45° relative to the axis of rotation of the tool.

26. A system according to claim 5, in which each secondary channel opens onto the end surface of the cutting part, in a secondary clearance of an end cutting edge, at a distance of at least 0.5 mm from a first end clearance of said end cutting edge.

27. A system according to claim 5, in which the secondary channels have cross-sections whose sum is at least equal to the cross-section of the central channel.

28. A system according to claim 5, in which the end dedendum angle is closely equal to 6°.

29. A system according to claim 5, in which each side cutting edge comprises a non-nil circular land, less than 0.1 mm.

30. A system according to claim 5, in which each end cutting edge comprises a first end clearance of width comprised between 0.3 mm and 0.4 mm.

31. Rotary cutting tool according to claim 2, in which the closed end of the central channel is located very closely to the end surface of the cutting part.

32. Rotary cutting tool according to claim 3, in which the closed end of the central channel is located very closely to the end surface of the cutting part.

33. Rotary cutting tool according to claim 4, in which the closed end of the central channel is located very closely to the end surface of the cutting part.

34. Rotary cutting tool according to claim 2, in which the secondary channels have cross-sections whose sum is at least equal to the cross-section of the central channel.

35. Rotary cutting tool according to claim 3, in which the secondary channels have cross-sections whose sum is at least equal to the cross-section of the central channel.

36. Rotary cutting tool according to claim 4, in which the secondary channels have cross-sections whose sum is at least equal to the cross-section of the central channel.

37. Rotary cutting tool according to claim 2, in which the end dedendum angle is closely equal to 6°.

38. Rotary cutting tool according to claim 3, in which the end dedendum angle is closely equal to 6°.

39. Rotary cutting tool according to claim 4, in which the end dedendum angle is closely equal to 6°.

40. Rotary cutting tool according to claim 1, in which the width of the first clearance is closely equal to 0.3 mm.

41. Rotary cutting tool according to claim 3, in which the width of the first clearance is closely equal to 0.3 mm.

42. Rotary cutting tool according to claim 4, in which the width of the first clearance is closely equal to 0.3 mm.

43. Rotary cutting tool according to claim 2, in which said tool comprises, successively, beyond the cutting part and along the axis of rotation of the tool, a clearance section of diameter d, and a tail section of diameter $d_Q$, connected to each other along a connection radius RR at least equal to $d_Q-d_1/2$, with a minimum of 0.1 $d_Q$.

44. Rotary cutting tool according to claim 3, in which said tool comprises, successively, beyond the cutting part and along the axis of rotation of the tool, a clearance section of diameter d, and a tail section of diameter $d_Q$, connected to each other along a connection radius RR at least equal to $d_Q-d_1/2$, with a minimum of 0.1 $d_Q$.

45. Rotary cutting tool according to claim 4, in which said tool comprises, successively, beyond the cutting part and along the axis of rotation of the tool, a clearance section of diameter d, and a tail section of diameter $d_Q$, connected to each other along a connection radius RR at least equal to $d_Q-d_1/2$, with a minimum of 0.1 $d_Q$.

* * * * *